United States Patent
Kojori et al.

(10) Patent No.: US 7,406,370 B2
(45) Date of Patent: Jul. 29, 2008

(54) ELECTRICAL ENERGY MANAGEMENT SYSTEM ON A MORE ELECTRIC VEHICLE

(75) Inventors: Hassan A. Kojori, Mississauga (CA); Rodney G. Michalko, Queensville (CA); Sophia V. Konyukhova, Woodbridge (CA)

(73) Assignee: Honeywell International Inc., Morristown, NJ (US)

( * ) Notice: Subject to any disclaimer, the term of this patent is extended or adjusted under 35 U.S.C. 154(b) by 440 days.

(21) Appl. No.: 11/196,323

(22) Filed: Aug. 4, 2005

(65) Prior Publication Data

US 2006/0042846 A1 Mar. 2, 2006

Related U.S. Application Data

(60) Provisional application No. 60/603,567, filed on Aug. 24, 2004.

(51) Int. Cl.
*B60L 11/00* (2006.01)
*B64D 35/00* (2006.01)

(52) U.S. Cl. ............................ 701/22; 180/65.8; 244/60
(58) Field of Classification Search .................... 701/22
See application file for complete search history.

(56) References Cited

U.S. PATENT DOCUMENTS

| | | | | |
|---|---|---|---|---|
| 3,544,803 | A * | 12/1970 | Taylor | 307/10.1 |
| 6,396,164 | B1 * | 5/2002 | Barnea et al. | 307/10.1 |
| 6,476,515 | B1 * | 11/2002 | Yamamoto et al. | 307/10.1 |
| 6,961,644 | B2 * | 11/2005 | Mercier et al. | 701/36 |
| 7,269,491 | B2 * | 9/2007 | Katrak et al. | 701/54 |
| 2004/0117084 | A1 * | 6/2004 | Mercier et al. | 701/36 |
| 2004/0148071 | A1 * | 7/2004 | Itoh et al. | 701/22 |
| 2006/0261931 | A1 * | 11/2006 | Cheng | 340/426.1 |
| 2007/0170774 | A1 * | 7/2007 | Gerum et al. | 303/20 |

FOREIGN PATENT DOCUMENTS

| | | |
|---|---|---|
| DE | 41 14 999 A1 | 11/1992 |
| DE | 197 17 686 A1 | 10/1998 |
| DE | 103 03 383 A1 | 8/2004 |
| WO | WO-03/098403 A2 | 11/2003 |

* cited by examiner

*Primary Examiner*—Thomas G. Black
*Assistant Examiner*—Shelley Chen
(74) *Attorney, Agent, or Firm*—Oral Caglar, Esq.

(57) ABSTRACT

An electrical energy management system (100) for a more electrical vehicle is provided. The electrical energy management system (100) includes a vehicle operation system (120) for controlling operation of the more electrical vehicle; an electrical system (140) for controlling electrical power generation, conversion, distribution and aero system utilities of the more electrical vehicle; a first controller (102); and a second controller (104) redundant to the first controller (102). The second controller (104) is coupled to the first controller (102) via an inter-controller data bus (106). Each of the first and second controllers (102, 104) is coupled to the vehicle operation system (120) via a vehicle data bus (108). Each of the first and second controllers (102, 104) is coupled to the electrical system (140) via a local data bus (110). The first and second controllers (102, 104) process same data in a first operation mode and process different data in a second operation mode.

20 Claims, 4 Drawing Sheets

ELECTRICAL ENERGY MANAGEMENT SYSTEM ON A MORE ELECTRIC VEHICLE

CROSS-REFERENCE TO RELATED APPLICATIONS

The present application claims priority under 35 U.S.C. §119(e) of provisional patent application No. 60/603,567 filed Aug. 24, 2004, which is hereby incorporated by reference in its entirety.

FIELD OF THE INVENTION

The present invention relates to electrical power distribution, and more particularly to an electrical energy management system implementing redundant control units managing primary and secondary electrical system activity.

BACKGROUND OF THE INVENTION

"More electric" vehicle architectures have been proposed to shift the primary sources used for systems and services from pneumatic (engine bleed) and hydraulic sources to electric sources. Main challenges for supporting MEA ("More Electric Aircrafts") include not only the complexity of the level of electrical system control and coordination necessary to make the MEA workable but also envisioning technologies which meet the safety/reliability requirements of such a complex platform to be certifiable. A main concern is the fact that prior to MEA platforms, electrical power systems have historically used a distributed control scheme using a combination of electronic units and electromechanical logic to carry out the necessary functionality for electrical power distribution, protection and load management. Within this type of control scheme, the bus power controls were simple, with low criticality single channel logical controllers designed to augment existing control between the other federated system control units. The overall interaction between electrical system line replaceable units (LRU's) was limited, with the approach favoring autonomous control units that were indifferent to subtleties occurring elsewhere in the electrical system or the aircraft for that matter.

The advent of the MEA has created a situation whereby the traditional methods of electrical system control lack the sophistication necessary for the MEA. Not only is this due to the complex, critical control and protection functions being performed by the electrical power system but also the fact that the system should be able to communicate between a greater number of LRU's in order to ensure proper coordination of events. These LRU's are not only in the electrical system but also include other ATA chapter LRU's. In order to accommodate this high volume of communications and interactivity, the system design should employ high-speed processor based controls and data bus communications. Furthermore, the design should be highly flexible to account for future requirements that will only become evident as the development process of the MEA continues.

Hardware solutions based upon analog, discrete digital or even FPGA implementations of the past do not likely satisfy the flexibility and response time expected for such MEA platforms. Study of current and future aircraft equipment configurations has demonstrated that most systems on the MEA are linked in some way to the electrical power system. Therefore, as a result of the MEA, the electrical power system has become safety critical or at the very least essential to the proper functioning of systems which have traditionally had no dependency upon electricity. The key functions defining the safety of aircraft flight such as thrust, lift, stability, guidance, communications, life support and others are now significantly affected by the derivation or availability of electric power. The ability for the electrical system to perform complex management, test and reporting functions within a highly integrated aircraft environment will likely surpass any individual technology as the single largest risk factor for establishing the MEA as a viable air vehicle solution.

SUMMARY OF THE INVENTION

The present invention overcomes the aforementioned drawbacks by providing redundant control units to manage primary and secondary electrical system activity. According to one aspect of the present invention, an electrical energy management system for a more electrical vehicle comprises a vehicle operation system for controlling operation of the more electrical vehicle; an electrical system for controlling electrical power generation, conversion, distribution and aero system utilities of the more electrical vehicle; a first controller; and a second controller redundant to the first controller. The second controller is coupled to the first controller via an inter-controller data bus. Each of the first and second controllers is coupled to the vehicle operation system via a vehicle data bus. Each of the first and second controllers is coupled to the electrical system via a local data bus. The first and second controllers process same data in a first operation mode and process different data in a second operation mode.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION

In an embodiment of the present invention, an electrical energy management system (EEMS) includes dual redundant, high availability, high integrity processor based electronic control units capable of managing all primary and secondary electrical system activity on the more electric aircraft or other more electric vehicles to ensure availability of electrical services under all operating conditions. The EEMS is connected through a network of at least one vehicle data bus and at least one local data bus as well as at least one discrete wired connection or wireless communication methods to the other electrical system control centers and other communication systems on the vehicle. As a minimum for redundancy and segregation, the EEMS employs two electrical energy management controllers (EEMC's) that are engaged in the control and protection of power flow among a plurality of electrical system LRU's that may be concentrated in electrical equipment (EE) bays or dispersed throughout the vehicle. The EEMS system also provides the capability and flexibility of communication and coordination between the electrical system and other vehicle level integrated system equipment should more complex system interactions prevail.

The two EEMC's provide a supervisory control and communication system for the aircraft electrical system that works in harmony with aircraft aero systems (avionics, utility systems and engines) to provide a coordinated flow of energy (electrical and thermal/mechanical) derived from the combustion of fuel. The vehicle operation system interface such as an avionics interface is primarily a communications connection providing the EEMC's with aircraft level data so that the EEMC's are aware the prevailing conditions of the aircraft. Such conditions include but are not limited to, maintenance/loading/power up/taxi/inflight/decent/landing modes, refuel/towing, outside air temperature, icing conditions, emergency mode etc.) that are available continuously on the vehicle data bus. In addition, pilot commands or automated utilities controls communicated by vehicle data buses such as avionics data buses to the vehicle operation system such as aero systems that represent either positive or negative step function changes in power extraction must be made available to the EEMC's to anticipate system stability issues and provide seamless transitions. Such significant load changes include but are not limited to engine thrust, fuel pumps, fuel tank inerting compressors, cabin air compressors, vapor or air cycle machines, landing gear, flight controls, anti icing, and starting control of the auxiliary power unit.

Figure 1:
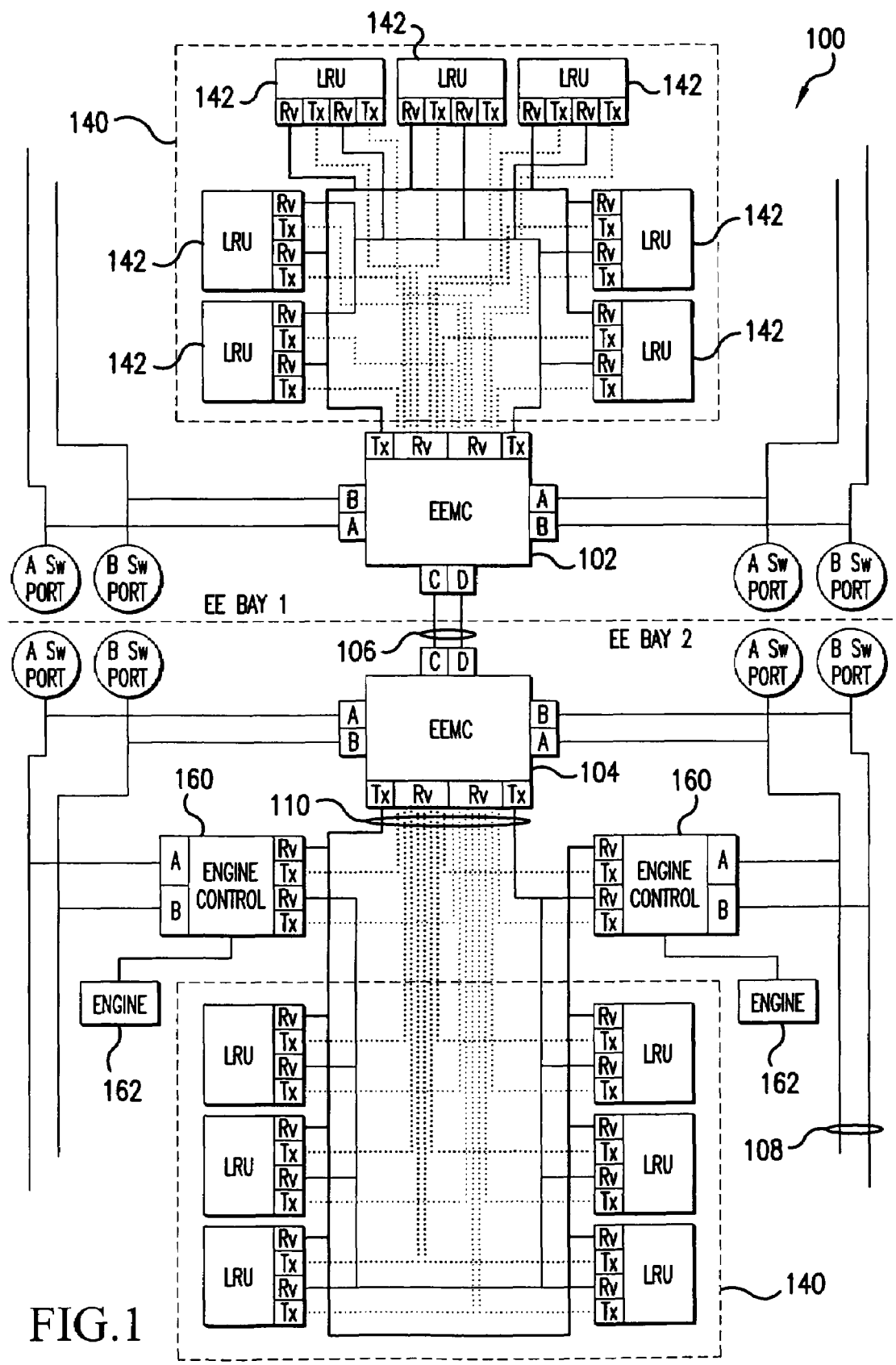
FIG. 1 illustrates an exemplary electrical energy management system (EEMS) interfaces between the electrical energy management controllers (EEMC's) and the electrical system in accordance with an embodiment of the present invention.
Figure 2:
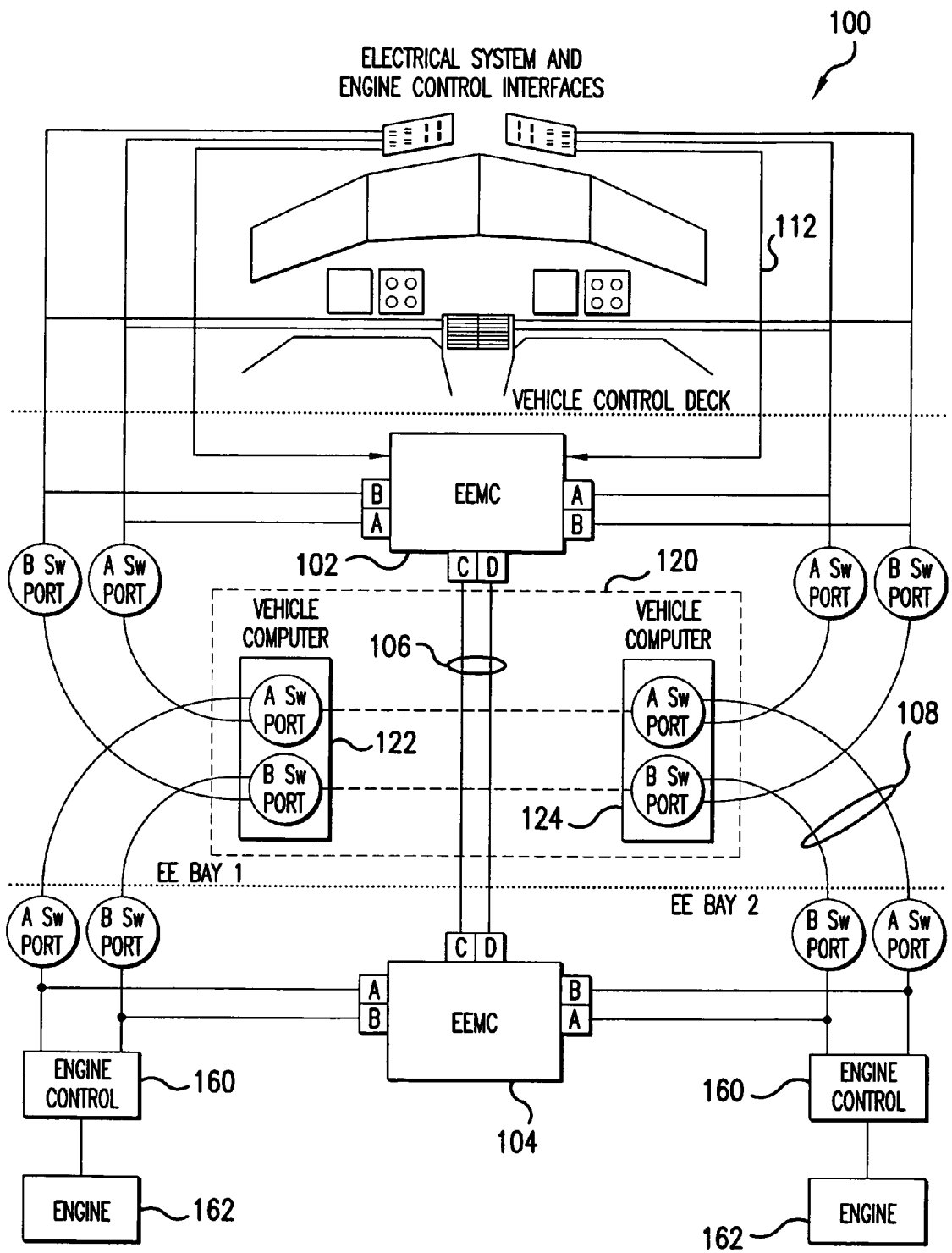
FIG. 2 illustrates an exemplary EEMS interfaces among the EEMC's, the vehicle operation system, and the engine control system in accordance with an embodiment of the present invention.

Referring to FIGS. 1 and 2, the EEMS 100 in the illustrated embodiment includes a vehicle operation system 120 for controlling operation of the more electrical vehicle, an electrical system 140 for controlling electrical power distribution of the more electrical vehicle, and two redundant electrical energy management controllers (EEMC's) 102 and 104.

Each of the EEMC's 102 and 104 is located in a separated EE bay. In an embodiment, the two EEMC's are physically separated to prevent damage or malfunction at the same time due to a single event. The event considered may be an environmental event that is perhaps foreseeable but often not foreseeable, and if foreseeable, its manifestation or subsequent impacts cannot be accurately predicted. Such events for example are propagation of fire, distribution of fluids, foreign object contact (birds, projectiles, ice, engine turbine burst, explosion, cargo), and electromagnetic hazards (such as lightning and HIRF). To appropriately to minimize these hazards, the hazard must first be identified and classified with respect to the likelihood of the hazard occurring and the consequence of the hazard should it occur. Then the appropriate response can be determined in each case. Due to the high criticality of the EEMC in the MEA with respect to vehicle safety, survivability of the EEMS should meet or exceed the actual and perceived performance of existing conventional, federated vehicle designs. Due to this level of criticality to continued safe operation of the vehicle, the consequence of failure takes precedent and positive and distinct means need to be employed to separate the EEMC's from common threats.

The physical separation of the EEMC's is one of the most effective ways to deal with the uncertainly aspects of the type of single event described above. In protecting against propagating or distributing effects, two units located at the opposite sides of a single area such as a single equipment bay may not be sufficiently separated in environment to avoid having the single event propagate to both units. In addition, although the units themselves may not sustain damage, the interconnect buses and wiring in the area may be vulnerable and render the operation of the EEMS non-serviceable.

To provide greater levels of separation, the two EEMC's in this embodiment are located forward and aft in the aircraft residing in respectively in forward and aft electrical equipment (EE) bays. In this configuration, the two EEMC's are in distinctly different locations of the aircraft where single events as defined would not be reasonably expected to effect both units. This to a lesser degree could be accomplished more locally by placing units outside of any common area such as an equipment bay where sufficient boundaries such as walls or partitions are between the two EEMC's. However, separation along the length of the vehicle not only results in the best opportunity for separation but also takes advantage of the normal MEA equipment layout. The typically envisioned layout for such a vehicle is to incorporate both a forward and aft EE bay. The aft bay includes the high power distribution and conversion and the forward bay includes the medium power equipment. By placing one EEMC forward and one aft EEMC allows the EEMC to function as a processing and data communication hub as well as provide local data bus and system control for electrical equipment in these respective equipment bays.

By placing one EEMC in the forward bay and one in the aft bay, separation is provided by the existing structure walls of the compartments between the forward and aft bays. In this type of implementation, no specialized or purpose built structure is expected to be required to achieve the level of separation required unless the vehicle is so small as to not offer sufficient spatial separation between the two EE bays. For EEMC's located in separate areas that are closer together, an assessment of each threat and its ability to propagate to both units as they are installed in existing structure would determine if specialized or dedicated structure is required to satisfy the separation requirements. If both EEMC's are located in the same bay with no existing vehicle supplied separating walls, then the EEMC would need to be suitably sealed or armored in order to separate the EEMC's from common threats.

Sealing would protect against fluid, foreign object damage (FOD), and dust by using designs with more material or gaskets or sealant and the like. However it would do so likely at the expense of convection or forced air cooling due to the plugging of all the cooling holes. Additional material or structure necessary to provide an equivalent level of protection within an air-cooled enclosure might include covers or shrouds or internal subassembly protection such as conformal coating, potting or drainage provisions. Protection against fire may include the sealing out of external environments such as described for fluids but may also need to utilize fireproof materials such as steel, stainless steel or titanium for the outer housing of the EEMC. In the case of projectiles or shock wave due to explosion or decompression, stronger (different strength, aramid fiber, Kevlar) or thicker (existing) material walls may be required to protect against the threat defined. In the case of EMC threats, equivalent magnitude and simultaneous hazards to both units are a risk when the two EEMC's are located close together. For such installations, each unit would need to meet the maximum threat level with that protection extended to the interface media. For this reason, fiber optics is desirable to minimize the EMC coupling and conducted effects. In each case described above, the protection employed to achieve separation of physically close EEMC's may be extended to interconnect wiring, optic or buses to achieve an EEMS wide separation. As a result, the additional design work and materials required to make commonly located EEMC's meet the system separation requirements may be significant and prohibitive and therefore a more spatially distributed arrangement that take advantage of existing vehicle boundaries is preferred.

In the illustrated embodiment, the EEMC 102 is coupled to the EEMC 104 via an inter-controller data bus 106. In the illustrated embodiment, the high speed, dedicated inter-controller data bus 106 is an optical data bus immune from electromagnetic interference. The inter-controller data bus 106 allows each EEMC to share all data, such as data from the electrical system 140, nearly instantaneously to supprt data integrity computations and redundant operations.

In the illustrated embodiment, each of the EEMC's 102 and 104 are dual channel units. In a first operation mode, all EEMC channels process the same data at the same time. Should one EEMC channel make a significant number of errors in computation over a predetermined time, then that channel could be deactivated to prevent contamination of the subsequent processing. The remaining three channels would be sufficient to continue to process the data based on the voting process and hence can continue without system integrity degradation.

In a second operation, all four channels within the two EEMC's could also individually process different data at the same time. For example, the data computation could be further subdivided based upon a lower criticality such that the forward (or aft) dual channel EEMC might process left and right data from forward (or aft) mounted electrical components or LRU's 142 of the electrical system 140 with this computation suitably partitioned from the more critical computation. As a result, all EEMC channels would be individually operational at the same time.

When one EEMC fails to operate, the back-up EEMC take over the primary EEMC. In this case, the EEMC is considered to be hardware failed (i.e., no output) and not logically failed. This could be attributable to loss of input power supply, failure of internal power supply, failure of bus communication, etc. The EEMC internal built in test (BIT) monitoring unit health would detect a failure of this magnitude and report to the remaining EEMC's regarding the failed EEMC. Under such a condition, if the failed EEMC is the master, the logic would reside within the EEMC's, activated by programming jumpers associated with the EEMC's installed position, to default to a predetermined new master and continue operation with the remaining EEMC's. Additional protection would also be required to ensure that hardware failures that could compromise logical computation but not result in complete loss of output be recognized by the BIT and de-activate or at least demote the suspect unit if it was the master unit in operation.

The vehicle operation system 120 in the illustrated embodiment includes a first vehicle computer 122 and a second computer 124 for processing the aircraft level computation. Each of the EEMC's 102 and 104 are coupled to the vehicle operation system 120 via a vehicle data bus 108. The vehicle data bus 108 is the aircraft level communication bus that the vehicle manufacturer or integrator has chosen for vehicle-wide information data transfer. This bus is generally configured as a synchronous bus in which each connected component has an assigned frame of time to broadcast to all other components attached to the bus. As bandwidth is limited, the expanding number different components in complex vehicle systems can tax the throughput of the system as well as the latency of the data exchange. As a result, the vehicle data bus 108 provides vehicle status information and communication between different system controllers and the pilot commands from the flight deck.

In the illustrated embodiment, each vehicle computer is a dual channel unit connected to an individual vehicle data bus 108 (A or B). This type of configuration can cover the single failure case of either the bus channel or the computer channel providing suitable availability for critical functions. Typically dual channel vehicle data buses are incorporated for redundancy in the case of a single channel failure. Since the same information is transmitted on both buses A and B, the individual components or LRU's of the electrical system can also use that data to determine if errors in transmission have occurred. In order to be completely redundant, data communication hubs are also duplicated in addition to the bus wire connections. This is a cost driver since each component or LRU connected to the bus must incorporate gateway electronics capable of interfacing with the vehicle data bus protocol. The EEMC reduces cost in the electrical system by serving as the single gateway from the vehicle operation system 120 to the electrical system 140 and then maintaining a simpler, less costly and faster local data bus to better serve the electrical system needs.

There are other components connected to the vehicle data buses 108 such as the common computing system (CCS) which host the aircraft avionics and aero utility systems that can function in this domain and do not require segregation for safety reasons. The CCS usually is the administrator of the vehicle data bus for other equipment to use. Other equipment connected to the vehicle data bus can be pilot interface panels, engine full authority digital controls (FADEC), APU FADEC, federated utility controllers, entertainment systems, and/or maintenance interfaces.

In the illustrated embodiment, either one or both of the first and second vehicle computers 122 and 124 process aircraft level data based upon a criticality requirement of the vehicle operation system. Depending upon the failure arbitration method employed, one computer unit could be operational while the other is on standby if the arbitration method employed could meet the criticality requirements established for the vehicle computer system.

Typically, minimum of three channels may be used for failure arbitration for critical classification. Therefore, both of the first and second vehicle computers 122 and 124 may process the same aircraft level data at the same time in a failure arbitration mode to determine data integrity because two dual channels (i.e., four) working at the same time, represented by the two computing enclosures shown in FIG. 2, would exceed this requirement. In addition, if the two computer units were processing different local data, or processing left and right aero system equipment data for redundancy, then both units would be operational at the same time for different data.

The EEMC receives data relevant to the operation of the electrical system 140 from the LRU's 142 or components of the electrical system 140 and uses the data to correctly supervise and control the electrical system operation. Information communicated between the EEMC to the vehicle computer may include, but not limited to, magnitude and polarity of electrical current output from each power source, magnitude and polarity of bus voltage, contactor and circuit protection position/status, fault protection status of components and buses, and system health.

Upon receipt of the following data, the vehicle computer presents the system status (voltage, current, failures and faults) to the pilot for monitoring and if necessary, corrective action instruction. The vehicle computer can also take failure data and communicate to ground operations the need for maintenance and or parts for servicing upon landing. The vehicle computer can also perform trend or prognostic health monitoring algorithms of parameters collected by the EEMC for preventative maintenance activities.

On the other hand, the vehicle computer may send requests to the EEMC for selected service operation as determined from the flight deck pilot interface and the aero system utility controls. In addition, the vehicle computer sends air data such as altitude, temperature, airspeed, flight phase etc. that the EEMC needs to properly control the operation of the electrical system 140 during the particular conditions of each mode of vehicle operation.

The electrical system 140 in an embodiment may include the, pilot control interfaces, the engine/auxiliary power unit (APU) interfaces, normal and emergency generators and generator control units (GCU's), electrical power distribution panels, motor controllers, electrical power conversion equipment (transformer rectifier unit (TRU) and inverters), electrical power storage batteries, and interconnect wiring cabling and data buses. As such the EEMC forms the supervisory control and communications hub for the electrical system 140 and manages the interface to the vehicle operation system 120 such as the aero systems of the aircraft. In this context the LRU's such as generators, GCU's, TRU's etc. are covered generically in the data bus network as LRU's.

Figure 3:
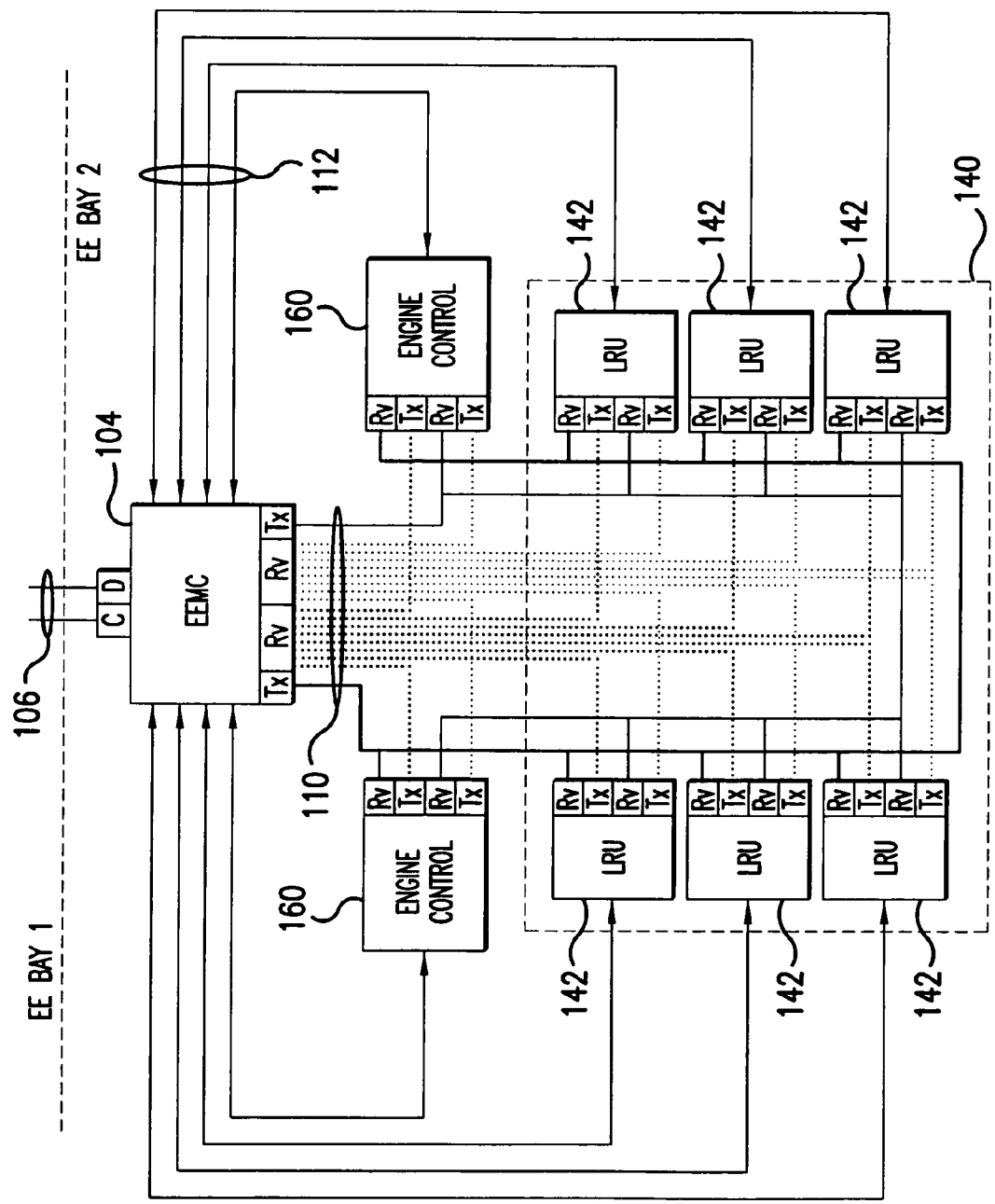
FIG. 3 illustrates an arrangement for EEMS local data bus and discrete interfaces in accordance with an embodiment of the present invention.

One of the EEMC functions is to provide supervisory control and communication between the electrical components of the electrical system 140. As shown in FIGS. 1 and 3, the electrical components are generically shown as LRU's 142 and could be of several different types and configurations of components depending upon the system architecture. LRU's 142 can be active controllers that lend themselves to data bus communication such as generator control units, electrical load control units (ELCU's), motor controllers, battery chargers, contactor driver printed circuit cards, Hall effect sensors, secondary power distribution controllers, or data acquisition units. LRU's 142 could also be passive devices such as batteries, transformer rectifier units, current shunts, current transformers, and position sensors. The EEMC is coupled to the LRU 142 via a local data bus 110 or a discrete wired connection 112.

An embodiment to implement the local data bus 110 is a star connection to the LRU's to allow timely performance of the event-driven logic typical to rapid response time circuits. A discrete hard-wired connection 112 may be implemented to facilitate high-speed system information transfer between the electrical system components and the EEMC. Very high-speed information or critical function requirements not suitable for the local data bus 110 can be accommodated in this manner to provide equivalent levels of safety typical of more traditional approaches.

Figure 4:
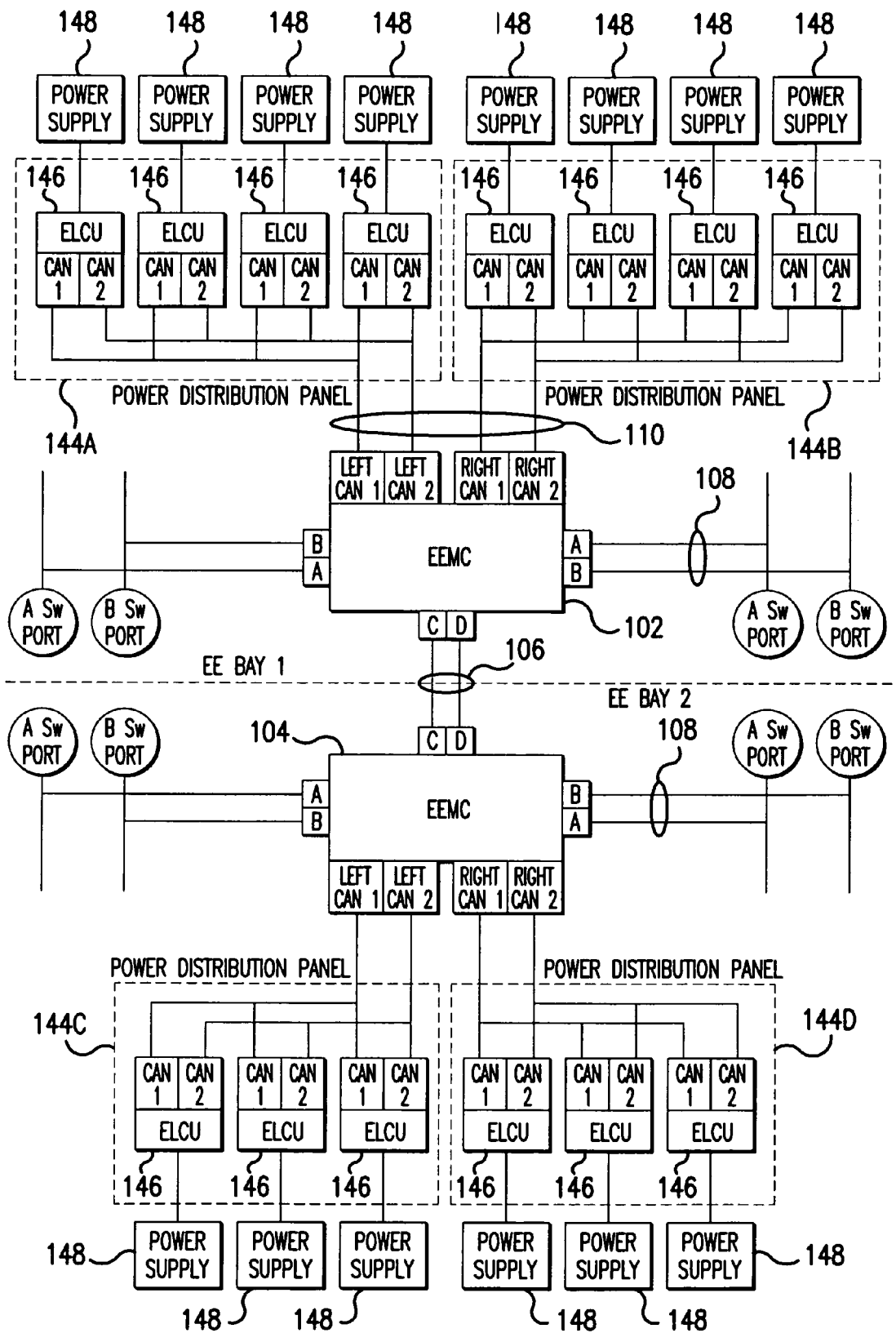
FIG. 4 illustrates an arrangement for EEMS power distribution panel interfaces in accordance with an embodiment of the present invention.

FIG. 4 illustrates an arrangement for EEMS power distribution panel interfaces in accordance with an embodiment of the present invention. In an embodiment, the electrical system 140 includes at least one primary electrical power distribution panel 144. As shown in FIG. 4, the electrical system 140 includes four electrical primary power distribution panels 144A-D. Each of the EEMC's 102 and 104 is coupled to the primary electrical power distribution panels 144 via the local data bus 110 and/or the discrete wired connection 112.

The primary power distribution panels or similar enclosures responsible for high current power distribution of typically generated 28 and 270 VDC or 115 and 230 VAC power may include electrical load control units (ELCU) as subsystem elements of the distribution network. In the illustrated embodiment, each power distribution panel 144 includes at least one ELCU 146. The EEMC receives an electrical load request from the vehicle operation system 120 and outputs an electrical load command to the electrical load control unit 146. The ELCU 146 receives the electrical load command via the local data bus 110 to engage or disengage an electrical load to an electrical power supply 148.

Therefore, simplification of the control electronics required by the primary distribution panel is achieved using the EEMC as the gateway to the vehicle operation system 120. Since the local data bus 110 between the EEMC and the ELCU 146 is less sophisticated than the vehicle data bus 108, considerable savings can be achieved by using the EEMC as the gateway to the vehicle data bus 108. The EEMC then provides the appropriate communications to the individual ELCU's within the primary power panel based upon the vehicle operation system's command.

In this manner, a further benefit of using the EEMC is that it inherently affords the proper hierarchy of control needed between the various vehicle operation systems such as aero systems and the electrical system. While the vehicle operation system 120 such as a pilot or utility system may request that a particular system be switched on, the EEMC in keeping with its function of providing properly coordinated and sequenced power loading, is responsible to bring that service on-line in harmony with other loads, the engines and the vehicle (e.g., aircraft) power availability. As a result, the EEMC will take the request for a service function from the vehicle data bus 108 and in the process of translating that information to the ELCU 146 via the local data bus 110, and will determine the acceptability of that load application. In doing so, the EEMC will ascertain the size of the load and in what sequence the load should be applied, and will determine availability of power to supply the load among other factors. The ELCU 146 also exercises its function as a circuit protection device to autonomously disengage in the event of a fault. In an embodiment, the fault may be a short or arc fault. After a fault occurs, a subsequent electrical load command to the ELCU 146 is inhibited until the EEMC recognizes a reset request from the vehicle operation system 120 (e.g., a pilot initiated reset) and the EEMC has received the status from the ELCU 146 indicating that the fault no longer exists.

In an embodiment, the ELCU 146 is an electronic $I^2t$ control card that supplies controls to an electromechanical contactor to first engage and then disengage the load in response to the load request of the vehicle operation system 120 such as a utility system or pilot control. The switching mechanism could also be replaced with a power semiconductor or other mechanism in the future should the technology be developed to handle the power levels required for a particular application. The ELCU 146 also provides an autonomous function to disengage the load should the electrical current measured flowing through the ELCU 146 exceed the limits prescribed by the respective $I^2t$ relationship.

The local data bus 110 from the EEMC to the ELCU 146 may present the ON, OFF and RESET commands from the vehicle operation system 120 such as a pilot or utility system communicated by the vehicle data bus 108 to the individual ELCU 146. Further information exchanged between the EEMC and the ELCU 146 that is envisioned although not to the exclusion of other data is the load current passing through the ELCU, $I^2t$ vs arc fault trip, load/wiring health monitoring, maintenance information (BIT) and on vehicle downloading software. An example of a simple bus protocol that is currently available for this type of ELCU application is Controller Area Network (CAN). However, this would not preclude the use of other readily available protocols that may be selected based upon throughput, integrity, cost, availability or commonality with existing vehicle data buses.

The power distribution interfaces described above are for the ELCU interface. Other non-ELCU associated contactors in the power distribution panels 144 are controlled by electronic driver printed circuit cards within the power distribution panels 144 that are in communication via the local data bus 110 to the EEMC. Information exchanged between the EEMC and the power distribution panels 144 would include open/close commands, voltage and current levels, fault current detection, ground fault detection, arc fault detection, contactor position feedback, temperature etc. The EEMC may, for reasons of latency, reliability, redundancy or system simplicity, be designed to directly control through discrete wiring connection to the primary power contactor coil, position sensing, current sensing, voltage sensing sub assemblies within the primary power panels 144.

In the illustrated embodiment, the EEMS 100 also includes an engine control system interface 160 for adjusting engine power output of each engine 162 to suit the electrical power supply 148 conditions. The engine control system 160 is coupled to the EEMC via at least one of the local data bus 110 and the discrete wired connection 112.

In an MEA, power extraction from the engines to power the electrical services can be so significant that the propulsion or APU engine performance or stability could be adversely affected if its shaft output power availability is not coordinated with the extraction demand from the generators mounted on the accessory drive output shaft. In order to ensure that the power interface is properly managed, the EEMC and the engine control system 160 are in communication through the local data bus 110 and discrete wired connection 112 as determined necessary to meet data latency and reliability requirements. Engine controls are more commonly full authority digital controls (FADEC) on modern aircraft, but even older aircraft engines utilize hybrid hydro-mechanical/electronic controls that have the local data bus or discrete wiring outputs that could interface with the EEMC described. Since changes in engine power and electrical power are independent parameters in a conventional aircraft systems environment, the close interdependence of these two services in an MEA requires data exchange between the EEMC and the engine control system 160 to provide coordinated power transitions. The anticipatory logic required to be performed by the EEMC and the engine control system 160 in the MEA system requires that the communication bus used between these units be almost instantaneous. This level of data transfer is necessary to afford the maximum time for the engine 162 and the EEMC to exercise appropriate mechanical activities such as fuel scheduling and electrical reconfiguration. Such mechanical activities may take significantly longer to execute making the functions intolerant of initial data latency and command logic computation. To minimize data bus latency and increase fidelity of data transfer, a dedicated local bus that is interrupt-based as opposed to synchronous-based allows for immediate communication and is the means to verify that the data has been received by the other unit. Such a bus is used for the EEMC to the LRU 142 communication and due to the star topology would be able to accommodate the engine control interface within that network or a similarly constructed redundant network.

The local data bus 110 from the EEMC to the engine control system 160 would communicate impending changes in power production or extraction from the engine 162 and the electrical system 140, respectively. Changes could include but are not limited to (1) utility load application or removal; (2) engines thrust setting increase or decrease; (3) load transfer due to generator failure; and (4) aircraft power up and auxiliary power.

(1) Utility Load Application or Removal.

If electrical load is increased through the activation of a service or number of services such as electrical pumps, compressors or fans, the EEMC could momentarily delay activation while the engine control system 160 such as an FADEC is notified of the impending power demand. When the engine increases the engine power output, the EEMC then switch on the required electrical service through its interface with the respective ELCU 146 or motor controller. This would serve to counter the increase in engine acceleration that would otherwise occur due to the increase in power setting and provide a consistent and stable engine operation. Similarly if the electrical service is to be switched off, the EEMC could delay the deactivation momentarily until the engine control system 160 decreases power in anticipation of the reduced power demand. In other words, upon receiving the electrical load request to change the electrical load, the EEMC notifies the engine control system 160 to change the engine power output and waits until the engine control system 160 to begin to change the engine power output before the electrical load command is sent to the ELCU 146.

(2) Engines Thrust Setting Increase or Decrease.

While an increase in thrust coincides with an increased power extraction capability and would not suggest a problem considering a steady state electrical system demand, a decrease in thrust under the same initial conditions could cause engine instability. Under a thrust decrease condition, the engine control system 160 will momentarily delay action to advise the EEMC of the impending power output change. The EEMC could then take action to decrease power consumption by its online services, shed unnecessary loads, connect alternate sources such as the APU, batteries etc. or any combination of methods to meet the aircraft power needs while minimizing the impact to the engine power extraction. In other words, upon a request to decrease the engine power output, the engine control system 160 notifies the EEMC to decrease the electrical load and waits until the electrical load is decreased to decrease the engine power output.

(3) Load Transfer Due to Generator Failure.

In a dual redundant or greater system, conventional aircraft electrical systems would simply reconnect the loads of the failed source to the opposite engine channel to regain the lost electrical services. In an MEA aircraft, the magnitude of the transferred load (potentially a 100% increase over the extraction that the recipient engine was previously delivering) would result in an engine instability situation. To avoid the engine instability, the EEMC would gradually and sequentially apply the loads from the failed source to the other engine driven source while concurrently advising the engine control system 160 of the increase in power demand as described in (2) above. In other words, the engine control system 160 may control the engine power output of a plurality of engines 162. When one of the engines 162 fails to provide the engine power output, the EEMC notifies the engine control system 160 to change the engine power output of the other engine(s) and waits until the engine power output of the other engine(s) is increased to switch the electrical load connected to the power supply supplied by the failed engine to the power supply supplied by the other engine(s).

Furthermore with respect to the engine control system 160 for the failed generator, at the point that engine failure was determined imminent, the EEMC immediately advise the respective engine control system 160 to reduce power in anticipation of a reduction in power extraction. Although power extraction may be more abrupt depending upon the degree of advanced warning obtained by the EEMC, the immediate communication of the EEMC to the engine control system 160 advising of the power extraction reduction would facilitate minimizing any tendency toward engine overspeed.

(4) Aircraft Power Up and Auxiliary Power.

In order to power up the aircraft, the electrical system 140 should be initially energized. The EEMC performs this function via the discrete control connections from the flight deck or other suitable location such as a maintenance position. The EEMC energizes itself, checks the aircraft status, available power sources and the type of power up sequence requested. The EEMC then activates the necessary minimum infrastructure to power up the necessary equipment, and connects batteries or external power sources as available to facilitate pre-flight checks, boarding, cargo handling servicing and maintenance.

The on-board auxiliary power unit (APU) source may be used to provide a continuous source of electrical power for ground operation of the aircraft and electrical power for main engine starting after the EEMC has established primary infrastructure power up. The EEMC as the electrical energy management controller will interface with the APU engine control system to automatically co-ordinate the starting of the APU and bring the APU generators onto line. Once on line, the EEMC will send speed commands to the APU engine control system to be able to perform "No Break Power Transfers" (NBPT) between APU, main engine and ground power variable frequency electrical power supplies. During airborne operation, the EEMC system interface with the APU engine control system allows the EEMC to power up the APU automatically to supply additional electrical power to the system when the engine power extraction ability is limited. When operating in that manner, the data bus connection also coordinates electrical load transfers as described for the main engine in (1), (2) and (3) above.

What is claimed is:

1. An electrical energy management system for a more electrical vehicle, comprising:
    a vehicle operation system for controlling operation of the more electrical vehicle;
    an electrical system for controlling electrical power generation, conversion, distribution and aero system utilities of the more electrical vehicle;
    a first controller; and
    a second controller, the second controller being redundant to the first controller, the second controller being coupled to the first controller via an inter-controller data bus, each of the first and second controllers being coupled to the vehicle operation system via a vehicle data bus, each of the first and second controllers being coupled to the electrical system via a local data bus, the first and second controllers processing same data in a first operation mode and processing different data in a second operation mode.

2. The system of claim 1, wherein each of the first and second controllers includes two controller unit channels, each controller unit channel of the first and second controllers processing the same data in the first operation mode based on a voting basis.

3. The system of claim 2, wherein one of the controller unit channel of the first and second controllers is deactivated when a predetermined number of errors occur in a predetermined period of time during the first operation mode.

4. The system of claim 1, wherein the vehicle operation system includes a first vehicle computer and a second computer, either one or both of the first and second vehicle computers processing aircraft level data based upon a criticality requirement of the vehicle operation system.

5. The system of claim 4, wherein both of the first and second vehicle computers process the same aircraft level data at the same time in a failure arbitration mode to determine data integrity.

6. The system of claim 5, wherein each of the first and second vehicle computers includes two computer channel units, each computer channel unit of the first and second vehicle computers processing the same aircraft level data at the same time in the failure arbitration mode to determine data integrity.

7. The system of claim 4, wherein both of the first and second vehicle computers process the different aircraft level data at the same time in a non-failure arbitration mode.

8. The system of claim 1, wherein the electrical system includes at least one electrical power distribution panel, each of the first and second controllers being coupled to the electrical power distribution panel via the local data bus and a discrete wired connection.

9. The system of claim 8, wherein the electrical power distribution panel includes primary power contactors, position status sensing units, current sensing units, and voltage sensing units, the first and second controllers being coupled to at least one of the primary power contactors, the position status sensing units, the current sensing units, and the voltage sensing units via the discrete wired connection.

10. The system of claim 8, wherein the electrical system includes at least one line replaceable unit (LRU), the first and second controllers being coupled to the line replaceable unit via the local data bus or the discrete wired connection.

11. The system of claim 8, wherein the electrical power distribution panel includes at least one electrical load control unit, at least one of the first and second controllers receiving an electrical load request from the vehicle operation system and outputting an electrical load command to the electrical load control unit, the electrical load control unit receiving the electrical load command via the local data bus to engage or disengage an electrical load to an electrical power supply.

12. The system of claim 11, wherein the electrical load control unit autonomously disengages the electrical load from the electrical power supply when a fault occurs.

13. The system of claim 12, wherein the fault includes at least one of a short fault and an arc fault.

14. The system of claim 12, wherein a subsequent electrical load command to the electrical load control unit is inhibited after the fault occurs until at least one of the first and second controllers recognizes a reset request from the vehicle operation system and a status of non-existence of the fault from the electrical load control unit.

15. The system of claim 11, further comprising an engine control system for controlling engine power output of at least one engine to the electrical power supply, the engine control system being coupled to the first and second controllers via at least one of the local data bus and the discrete wired connection.

16. The system of claim 15, wherein upon receiving the electrical load request to change the electrical load, at least one of the first and second controllers notifies the engine control system to change the engine power output and waits until the engine control system changes the engine power output to output the electrical load command to the electrical load control unit or power distribution contactor.

17. The system of claim 15, wherein upon a request to decrease the engine power output, the engine control system notifies at least one of the first and second controllers to decrease the electrical load and waits until the electrical load is decreased to decrease the engine power output.

18. The system of claim 15, wherein the engine control system is for controlling the engine power output of a first engine and a second engine, when one of the first engine and the second engine fails to provide the engine power output, at least one of the first and second controllers notifying the engine control system to change the engine power output of the other of the first engine and the second engine and waiting until the engine power output of the other of the first engine and the second engine is increased to switch the electrical load connected to the power supply supplied by the one of the first engine and the second engine to the power supply supplied by the other of the first engine and the second engine.

19. The system of claim 1, wherein the electrical system includes an auxiliary power unit control system, the auxiliary power unit control system controlling the power output of an auxiliary power unit, the power output of the auxiliary power unit being provided for at least one of a ground operation, a start-up operation of the engine, an additional power supply when the engine power output in flight or on ground is less than the electrical load specified by the electrical load request.

20. The system of claim 1, wherein the inter-controller data bus is an optical data bus immune from electromagnetic interference, the first and second controllers sharing the data of the electrical system via the optical data bus.

* * * * *